Aug. 1, 1950          H. PESCH          2,517,342

FRUIT CUTTER AND STONER

Filed May 8, 1946          5 Sheets-Sheet 1

Inventor
Herman Pesch
By Mason, Porter, Diller & Stewart
Attorneys

Aug. 1, 1950  H. PESCH  2,517,342
FRUIT CUTTER AND STONER
Filed May 8, 1946  5 Sheets-Sheet 2

Herman Pesch
Inventor

By Mason, Porter, Diller & Stewart
Attorneys

Aug. 1, 1950 — H. PESCH — 2,517,342
FRUIT CUTTER AND STONER
Filed May 8, 1946 — 5 Sheets-Sheet 3

Herman Pesch
Inventor

By Mason, Porter, Miller & Stewart
Attorneys

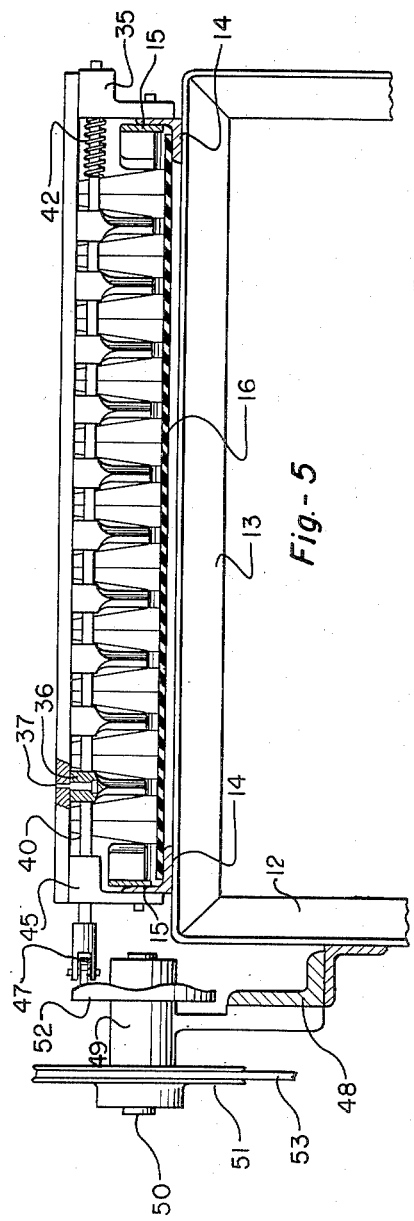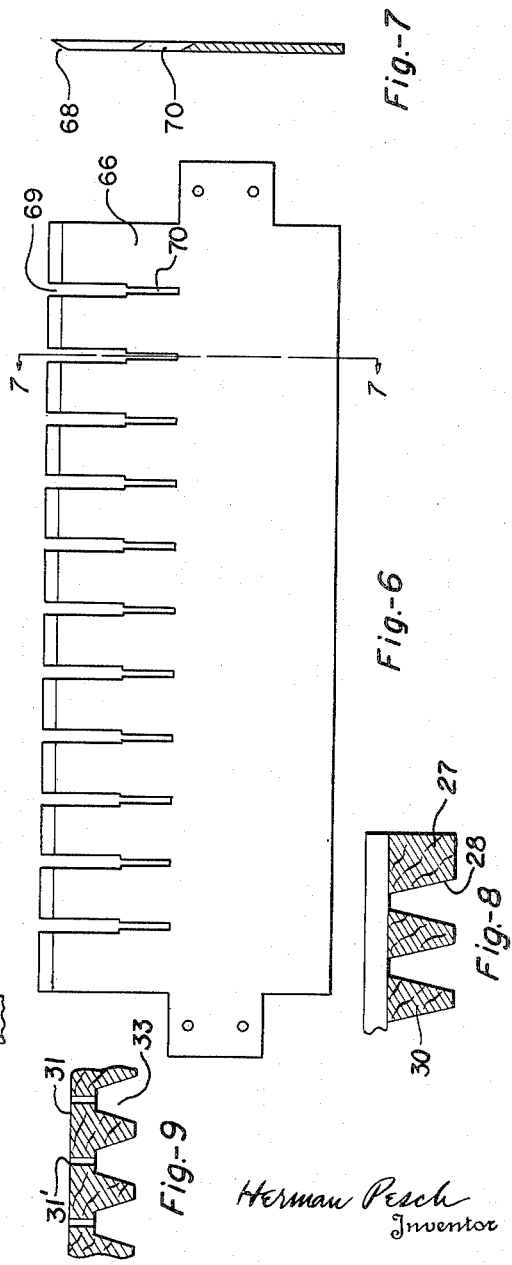

Patented Aug. 1, 1950

2,517,342

UNITED STATES PATENT OFFICE 2,517,342

FRUIT CUTTER AND STONER

Herman Pesch, Fayetteville, N. Y., assignor to Continental Can Company, Inc., New York, N. Y., a corporation of New York Application May 8, 1946, Serial No. 668,250

12 Claims. (Cl. 146—28)

The invention set out in the following specification relates to novel improvements in a fruit cutter and stoner. It is particularly designed to remove the pits or stones from the drupaceous fruits such as plums, prunes, peaches and the like where the fruit is ellipsoidal rather than spherical.

Fruit of this character is frequently dried or prepared for the market without first removing the pits or stones. However, when the stones are left with the fruit, there is greater likelihood of fermentation developing during the drying process.

In the removal of the pits it is important to divide the fruit along the plane occupied by the seam or fold. Care must also be taken not to bruise, crush or otherwise impair the flesh or pulp of the fruit in the pitting operation.

An object of my invention is to remove the stones or pits from drupaceous fruit in a rapid manner with the least likelihood of damage to the flesh of the fruit. Specifically, the material treated will be prunes, plums and the like.

A further object of my invention is to accomplish the removal of the stones from ellipsoidal fruit, taking care that the latter is divided along the plane of its fold or seam.

A still further object of my invention is to present the individual fruits to the stone separating mechanism in such a manner as to split the fruit along the fold or seam.

Among the objects of my invention is also the successful separation of the stones from the fruit after the latter has been split in the manner described.

An incident of my invention is to increase the quantity of fruit which may be treated simultaneously and thus expedite the pitting.

Further objects of my invention will be readily understood and others will be apparent from the description of the preferred form of my invention as illustrated by way of example in the attached drawings. In the latter:

Fig. 5 is a fragmentary front elevation, some of the parts being shown in vertical section;

Fig. 6 is a front view of the stripper plate;

Fig. 7 is a vertical section of the stripper plate taken on the line 7—7 of Fig. 6;

Fig. 8 is a vertical transverse section of the guiding ribs or partitions taken on the line 8—8 of Fig. 4;

Fig. 9 is a horizontal transverse section of the same elements taken on the line 9—9 of Fig. 1.

Figure 1:
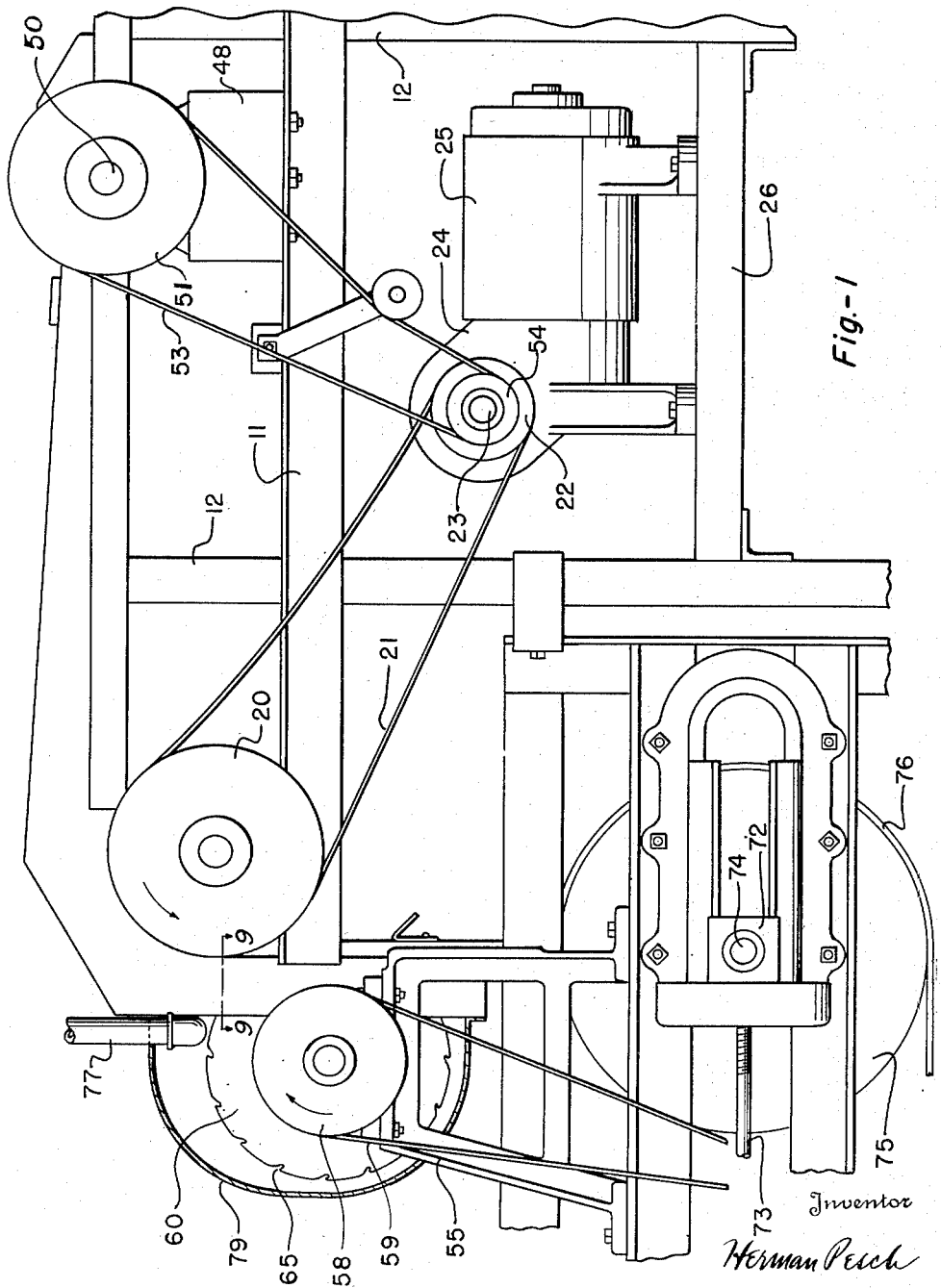
Fig. 1 is a side elevation of the assembled machine.

Briefly considered, the machine provides means by which soft, pulpy fruits of ellipsoidal form are fed in qantity over a traveling belt. The material is then diverted into channels where the effect of the belt is then to place the individual fruit in proper position for presentation to the pitting knives. Each fruit is advanced in such a position that it is presented with its fold or seam in the plane of the rotary pitting knife. The knife then not only splits the fruit, but also engages the pit and pushes it laterally from the pulp and through slots in the stripper plate. In this way the pits are separated from the pulp and disposed of while the pulp is dropped onto a delivery belt or conveyor. Any fragments of pits not thus disposed of will be separated from the pulp during the travel of the latter over the delivery conveyor.

The machine as illustrated in the drawings comprises a frame 11 on which the several structural elements are assembled. A series of uprights 12 are continued at the top to form cross bars 13. These cross bars form supports for tracks or guideways 14, 14, one being arranged longitudinally on each side of the frame. Side rails 15, 15 extend upwardly from the tracks 14, 14.

The tracks carry a horizontally extending endless feed or conveyor belt 16 which may be of suitable resilient material such as rubber, metal mesh or the like. The belt 16 is driven by a drum 17 carried on a shaft 18 which, in turn, is mounted on bearings 19, 19 on opposite sides of the frame. One end of the shaft 18 carries a pulley 20 which has a belt or drive chain 21. The belt 21 runs over a pulley 22 on a countershaft 23. The countershaft is part of a speed reducer 24 driven by an electric motor 25. The motor 25 is mounted on a platform 26 between the lower parts of uprights 12, 12.

Mounted on the frame above the belt 16 and on opposite sides thereof is a pair of side bars 27, 27. As shown in Fig. 8, these side bars have vertical outer surfaces but the inside surface has an overhanging tapered wall 28.

Intermediate the side bars 27, 27 there is arranged a series of longitudinal generally parallel partitions or bars 29. Each of these bars 29 has a horizontal portion 30 and a vertical portion 31 as shown in detail in Fig. 3. Referring to Fig. 4, the horizontal portions 30 of the bars 29 taper from the front to the rear of the machine, becoming wider as they approach the rear. There is thus formed a narrowing or tapering channel between each pair of adjacent bars 29 and between the outer bars 29 and the side bars 27. In the rear portion of the machine the bars 27 and 29 are fitted tightly together (see Fig. 4) and suitably supported from the side members of the frame 11. In the front of the machine the bars 27 and 29 are suspended beneath a cross bar 32.

Figure 3:
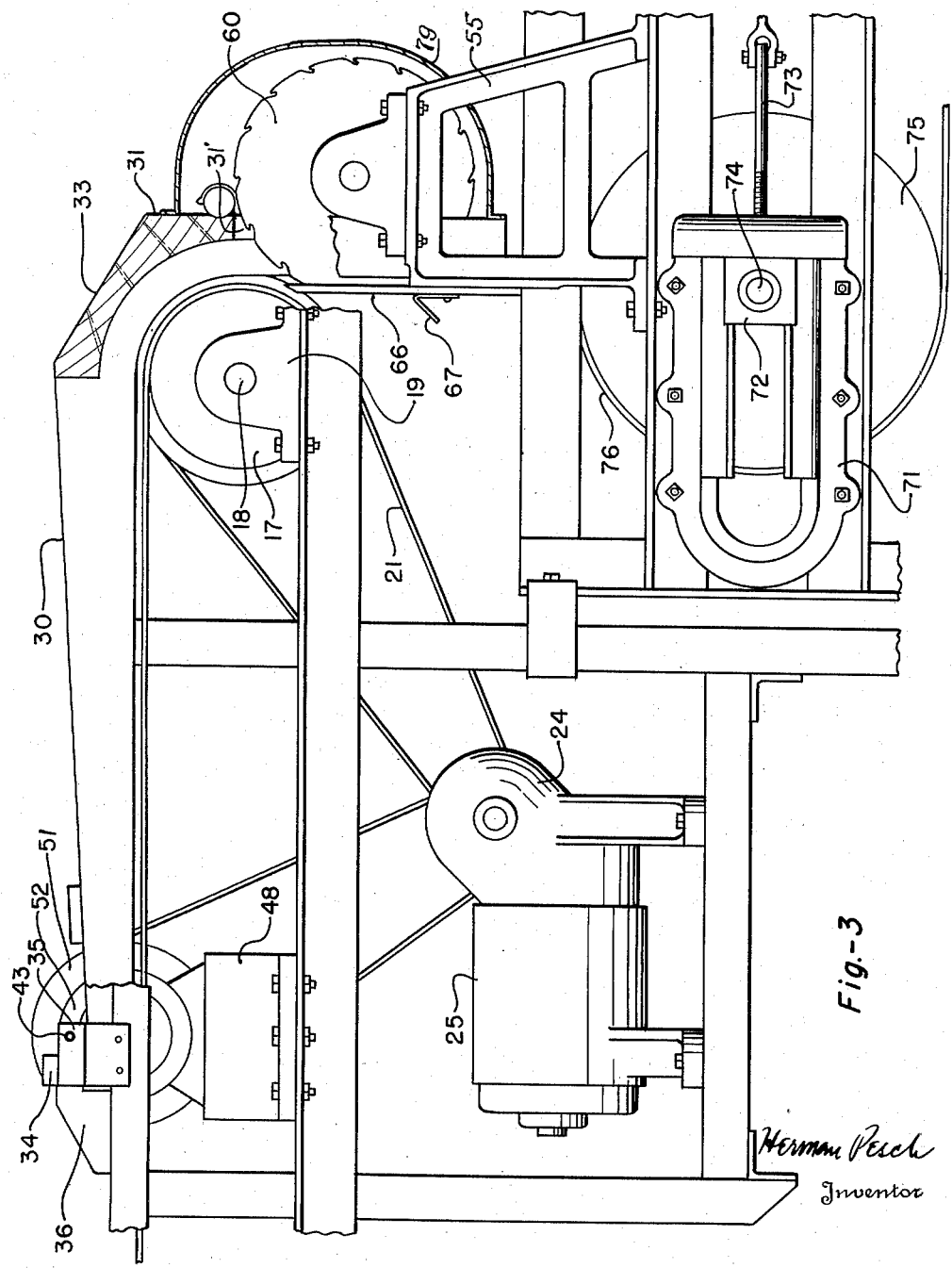
Fig. 3 is an elevation of the side opposite to that shown in Fig. 1 and also in part vertical section.
Figure 4:
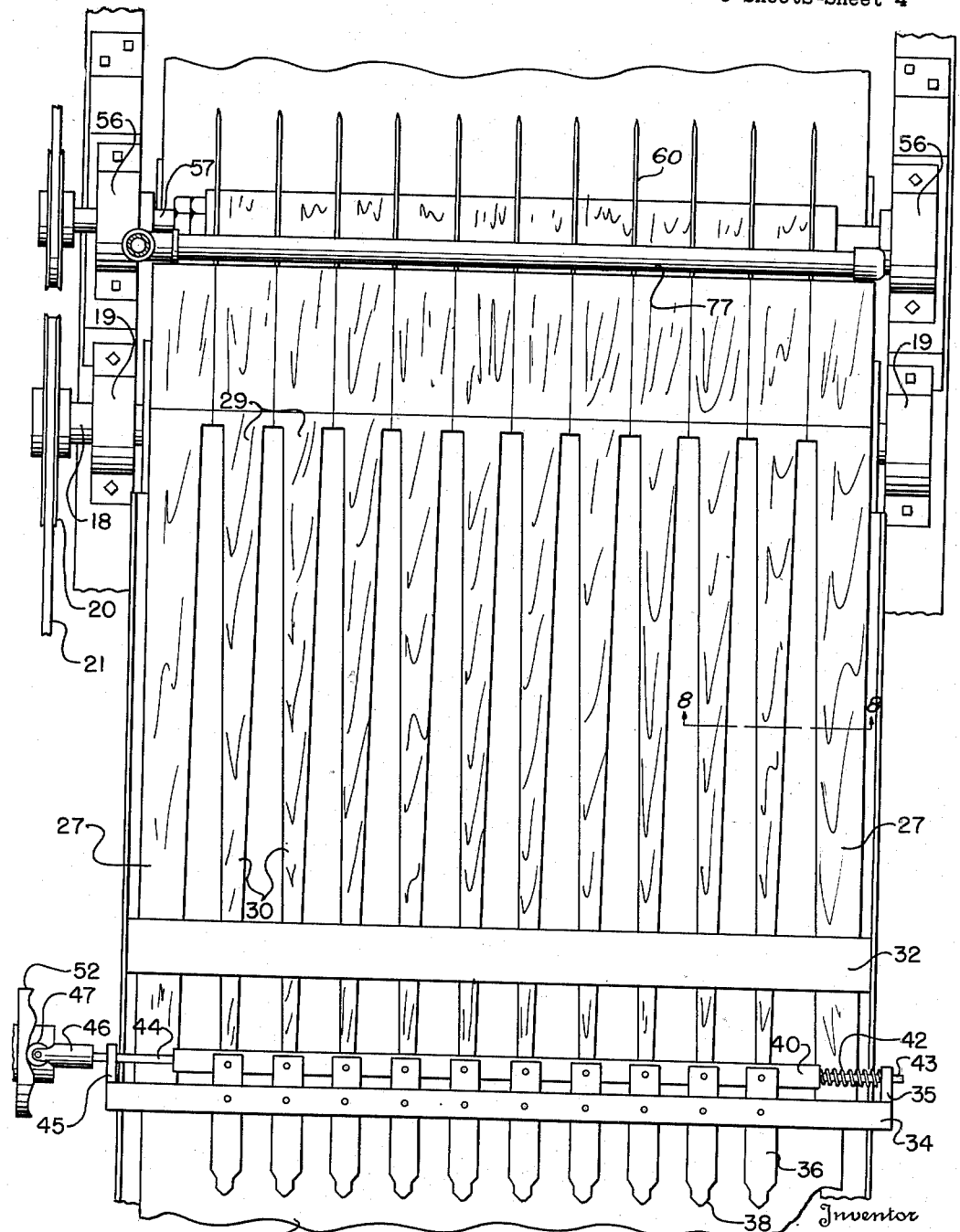
Fig. 4 is a top plan view of the machine.

The rear portion 31 of the bars 29 extend downwardly as shown in Fig. 3 and are generally in contact as indicated on Fig. 4. At a lower portion of the vertical sections 31, however, the bars are narrowed to form slots 31' in the meeting plane between adjacent bars.

The under side of the sections 31 are cut away to form chutes 33 as will be clear from Figs. 3 and 9.

The overhanging and converging walls of the bars 29 cooperate with the belt conveyor 16 to cause the fruit to tumble or rotate on a transverse axis at a right angle to the plane of the seam or fold in the fruit. This effect is continued in the vertical chutes 33. Thus the individual fruits are presented with the plane of the seam coincidental with the rotary stoning cutters.

A second cross bar 34 is mounted on the side rails 15 by means of brackets 35, and is slightly in advance of the front ends of the side bars 27 and sections 30. A series of oscillating fingers or deflectors 36 are suspended from the bar 34 above and in advance of the front ends of the members of the bar sections 30. The fingers 36 are capable of oscillating in a horizontal plane due to being loosely mounted upon a series of pivot pins 37 depending from the cross bar 34.

Figure 10:
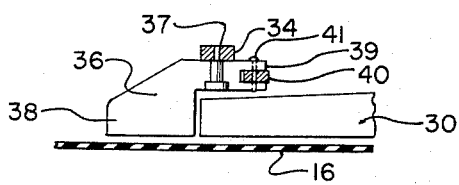
Fig. 10 is a side elevation of the oscillating deflector fingers.

The fingers extend forwardly to form narrowed or tapering blades 38. These blades are in line with members 30 and generally in the same elevation over the feed belt 16 as indicated in Fig. 10.

The rear ends 39 of the fingers 36 are forked to receive a push rod 40 that extends transversely of the machine. A pivot pin 41 connects the push rod 40 with each rear end 39 and permits the fingers to oscillate when the push rod is reciprocated transversely of the machine.

A spring 42 surrounds a reduced end 43 of the rod 40. The end 43 slides freely through a bracket 35 on the frame and which serves as an abutment for the spring 42.

The opposite reduced end 44 of the push rod 40 extends through and beyond the bracket 45 on the track 14 and carries a yoke 46. This yoke has a loose roller 47.

On a bracket 48 on the frame 11 beneath the bracket 45, there is mounted a journal bearing 49. This bearing carries a shaft 50 on which is mounted a pulley 51. On the shaft 50 on the opposite side of the bearing 49 there is mounted a cam disk 52. This cam disk is engaged by the roller 47 as the push rod 40 is advanced by the compression spring 42.

Pulley 51 has a belt or chain 53 by which shaft 50 is rotated from a pulley 54 on the shaft 23.

At the rear end of the frame there is provided on each side a bracket 55. These brackets form supports for journals 56, 56 for a cutter shaft 57. The cutter shaft 57 also has a pulley 58 driven by means of a chain or belt 59 from any suitable source of power.

Figure 2:
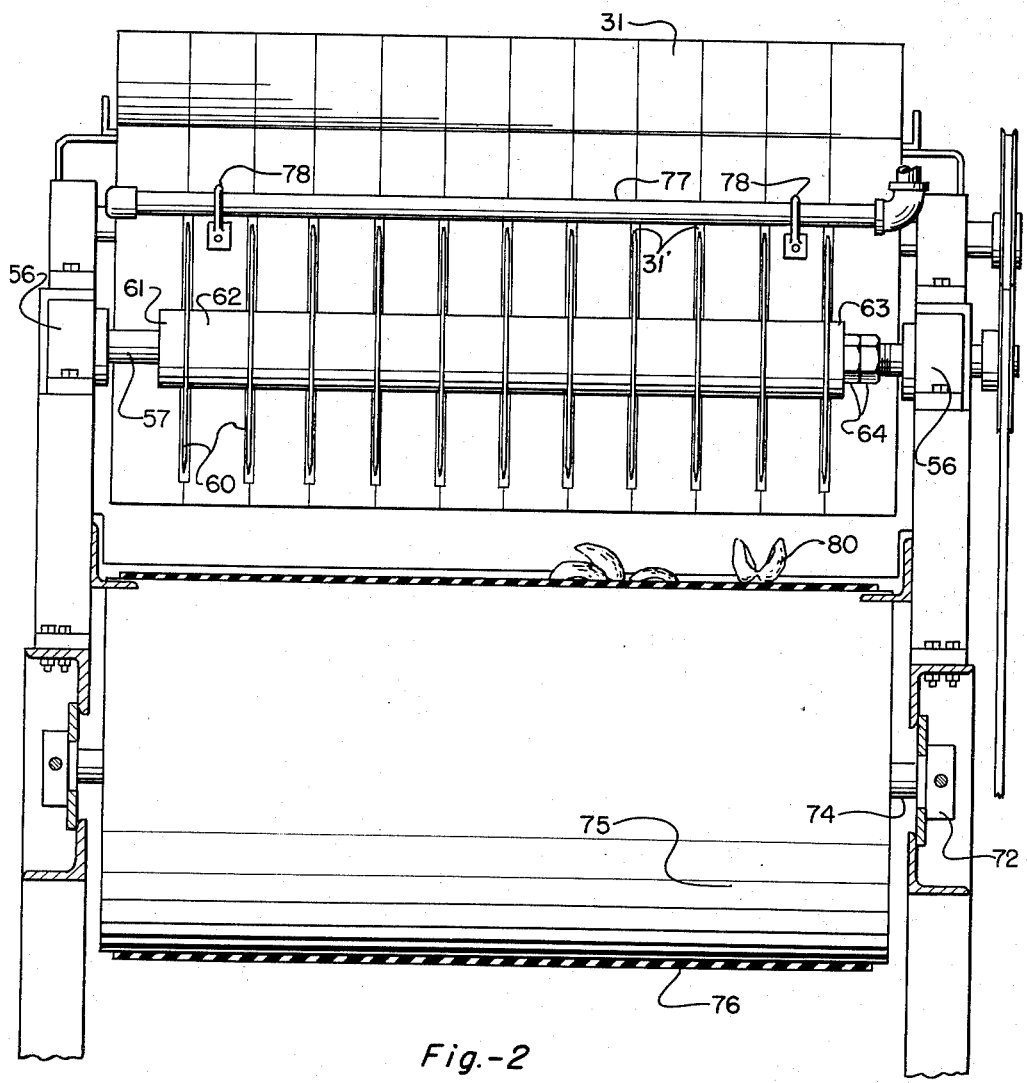
Fig. 2 is a rear elevation, some parts being shown in vertical section.

The shaft 57 has a series of fixed blades 60. These blades are mounted between an end collar 61 and a series of spacers 62. The opposite end of the series of blades is clamped by means of a collar 63 and lock nuts 64 threaded on the shaft 57. As shown in Fig. 2 the cutters 60 are in alignment with the slots 31' between the vertical members 31.

The cutters 60 are in the form of disks having a series of spaced teeth 65 faced forwardly in the direction of rotation.

It will be apparent from Fig. 3 that the cutters 60 extend through the slots 31' and also through the chutes or throats 33. On the opposite side of the chutes 33 there is a stripper plate 66. The stripper plate is mounted on the brackets 55 or other suitable part of the frame. On the side opposite from the cutters 60, the plate 66 has an apron or deflector 67.

The stripper plate 66 has a tapering upper edge 68 faced away from the chutes 33. The plate is slotted as shown at 69 in Fig. 6 opposite each cutter 60. The bottoms of the slots 69 are narrowed as at 70 to clear the cutters 60, but closely surround the latter.

The width of the slots 69 is sufficient to permit the seed or pit of the fruit to be carried through the wide portions of the slots but to be stripped from the cutters at the narrow portions 70 of the slots.

Fig. 7 shows the sloping end of the slot 70 and the two sloping shoulders between the slots 69 and 70. Each of these slopes is opposite the upper edge of the stripper plate.

The sides of the frame 11 carry slide bearings 71 for a pair of journals 72, 72. The journals are adjusted along the slide bearings 71 by means of tensioning bolts 73. The bearings 72 carry a loose shaft 74 on which is mounted a drum 75 extending across the frame. A discharge belt 76 passes over the drum 75 and extends to any convenient discharge point. The belt may be of any flexible material but preferably is an open-mesh metal fabric on which the cut halves of the fruit will rest while fragments of the pits or stones will drop through to a separate discharge.

Transversely above the series of cutters 60 there is a spray pipe 77. This is supported on hangers 78. Jets of rinsing water are directed from the pipe 77 against the sides of the cutters 60 to prevent the latter from becoming gummy with the juice of the fruit.

The cutters 60 are housed in a shield 79.

The machine as described above serves to receive fruit of the requisite type in large quantity on the traveling feed belt. As the fruit progresses, it is diverted into the chutes between the partitions by means of the oscillating deflectors. Between the partitions the fruit is caused to roll or tumble. At the same time the overhanging and tapering walls of the partitions orient the individual fruit into positions with their major axes longitudinally of the machine. Thus the fruits are delivered longitudinally into the concentric chutes 33. These chutes together with the stripper plate form a vertical passageway past the area where the chutes or channels are intersected by the thin toothed cutter blades.

As the fruits are thus presented to the cutter blades, the latter split the fruit longitudinally and generally along the plane of the seam or fold of the fruit. The teeth of the cutters engage the stones or pits and push them laterally against the stripper plate.

The upper portions of the slots in the stripper plate are wide enough to permit the pits to be pushed through by the teeth on the cutters. The stones are thus caused to drop on the deflector plate and into a receptacle or convenient means of disposal.

The divided or split sections of the pitted fruit will adhere to the sides of the cutters but are separated from them by means of the lower extensions of the partitions or channels. Thus the pulp sections fall onto the discharge belt and are carried away.

In the event that a stone or pit is engaged crosswise by a cutter, and is too large to be forced through the slot in the stripper plate, the pit will be crushed transversely and will drop away with the pulp sections. To meet this possibility, the discharge belt is of open character which will permit the pit portions to drop through and be disposed of.

As the juice of the fruit tends to dry on the sides of the cutters and become gummy or adhesive, it is desirable to provide a water spray on the cutters immediately before they engage the fruit.

The above arrangement of the machine is simple, rugged and efficient. The several features and structural elements have been described for purposes of illustration only and it is to be understood that various changes in size, proportions and materials is possible without departing from the scope of the invention set forth in the following claims.

What I claim is:

1. A machine for removing stones from fruit comprising a drum, an endless feed belt running over the drum, parallel partitions overlying the belt and extending vertically down the side of the drum, a circular toothed cutter between each pair of partitions and a vertical stripper plate tangential to the belt as it passes around the drum, said plate having vertical slots with narrow inner portions intersected closely by the cutters and wider outer portions through which the stones are carried by the teeth of the cutters.

2. A machine for removing stones from fruit comprising a drum, an endless feed belt running over the drum, parallel partitions overlying the belt and extending vertically down the side of the drum, said partitions converging toward the drum, a circular toothed cutter between each pair of partitions and a vertical stripper plate tangential to the belt as it passes around the drum, said plate having vertical slots with narrow inner portions intersected closely by the cutters and wider outer portions through which the stones are carried by the teeth of the cutters.

3. A machine for removing stones from fruit comprising a drum, an endless feed belt running over the drum, parallel partitions overlying the belt and extending vertically down the side of the drum, said partitions being wider at the top than at the bottom, a circular toothed cutter between each pair of partitions and a vertical plate tangential to the belt as it passes around the drum, said plate having vertical slots with narrow inner portions intersected closely by the cutters and wider outer portions through which the stones are carried by the teeth of the cutters.

4. A machine for removing stones from fruit comprising a drum, an endless feed belt running over the drum, parallel partitions overlying the belt and extending vertically down the side of the drum, deflectors pivotally mounted in advance of each partition, means for oscillating said deflectors laterally parallel and adjacent the moving belt, a circular toothed cutter opposite the drum between each pair of partitions and a vertical plate tangential to the belt as it passes around the drum, said plate having vertical slots with narrow inner portions intersected closely by the cutters and wider outer portions through which the stones are carried by the teeth of the cutters.

5. A machine for removing stones from fruit comprising a drum, an endless feed belt running over the drum, parallel partitions overlying the belt and extending down the side of the drum, a cross-bar over the front of the partitions, a series of deflectors pivotally mounted at intermediate points on the cross-bar and extending in front of the partitions parallel and adjacent the moving belt, the rear ends of the deflectors being fastened to a second cross-bar, means for oscillating the second cross-bar laterally, a circular toothed cutter opposite the drum between each pair of partitions and a vertical plate tangential to the belt as it passes around the drum, said plate having vertical slots with narrow inner portions intersected closely by the cutters and wider outer portions through which the stones are carried by the teeth of the cutters.

6. A machine for removing stones from fruit comprising a drum, an endless feed belt running over the drum, parallel partitions overlying the belt and extending down the side of the drum, said partitions being cut away to provide channels concentric with the drum, a circular toothed cutter opposite the drum between each pair of partitions and intersecting said channels and a vertical stripper plate beneath the drum and parallel to its axis and intersected by the cutters.

7. A machine for removing stones from fruit comprising a drum, an endless feed belt running over the drum, parallel partitions overlying the belt and extending down the side of the drum, said partitions being cut away to provide channels concentric with the drum, said channels having converging side walls, a circular toothed cutter opposite the drum between each pair of partitions and intersecting said channels and a vertical stripper plate beneath the drum and parallel to its axis and intersected by the cutters.

8. A machine for removing stones from fruit comprising a drum, an endless feed belt running over the drum, parallel partitions overlying the belt and extending vertically down the side of the drum, said partitions being cut away to provide channels concentric with the drum, a circular toothed cutter opposite the drum between each pair of partitions and intersecting said channels and a vertical stripper plate intersected by the cutters and forming a side wall for said channels.

9. A machine for removing stones from fruit comprising a drum, an endless feed belt running over the drum, parallel partitions overlying the belt and extending vertically down the side of the drum, a circular toothed cutter between each pair of partitions said cutter being rotatable in the direction opposite to that of the drum and on an axis parallel thereto, and a vertical plate tangential to the belt as it passes around the drum, said plate having vertical slots with narrow inner portions intersected closely by the cutters and wider outer portions through which the stones are carried by the teeth of the cutters.

10. A machine for removing stones from fruit comprising a drum, an endless feed belt running over the drum, parallel partitions overlying the belt and extending down the side of the drum to form vertical channels, a vertical stripper plate parallel to the drum axis and forming a side wall for said channels, said plate having vertical slots with narrow inner portions and wider outer portions opposite each channel and a circular toothed cutter between each pair of partitions intersecting the channel and both portions of the said slot.

11. A machine for removing stones from fruit comprising a drum, an endless feed belt running over the drum, parallel partitions overlying the belt and extending down the side of the drum to form vertical channels, a vertical stripper plate parallel to the drum axis and forming a side wall for said channels, said plate having vertical slots with narrow inner portions and wider outer portions opposite each channel and a circular toothed cutter between each pair of partitions intersecting the channel and both portions of the said slot of the plate, said partitions being extended beyond the area intersected by the cutters.

12. A machine for removing stones from fruit comprising a drum, an endless feed belt running over the drum, parallel bars for orienting ellipsoidal fruit with the stones in a longitudinal plane, longitudinally disposed rotary toothed cutters opposite the drum, partitions extending over the belt and downwardly beyond and between the cutters for guiding the fruit thus oriented to the cutters, a vertical stripper plate parallel to the drum axis and tangential to the cutters, said plate having vertical slots with narrow inner portions intersected closely by the cutters and wider outer portions to permit lateral removal of stones engaged by the toothed cutters, said partitions at their lower ends serving to remove the sections of the fruit pulp from the cutters.

HERMAN PESCH.

REFERENCES CITED

The following references are of record in the file of this patent:

UNITED STATES PATENTS

| Number | Name | Date |
|---|---|---|
| 457,940 | Stevenson | Aug. 18, 1891 |
| 460,740 | Briggs | Oct. 6, 1891 |
| 738,749 | Alfred | Sept. 15, 1903 |
| 878,676 | Scharf | Feb. 11, 1908 |
| 1,079,573 | Morton | Nov. 25, 1913 |
| 1,962,779 | Krum et al. | June 12, 1934 |
| 2,076,942 | Gardner | Apr. 13, 1937 |
| 2,259,332 | Winkelman | Oct. 14, 1941 |